US010565059B2

(12) United States Patent
Konik et al.

(10) Patent No.: US 10,565,059 B2
(45) Date of Patent: *Feb. 18, 2020

(54) ADAPTIVE OPTIMIZATION OF A COMPUTER DATABASE JOURNAL

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Otsego, MN (US); Chad A. Olstad, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 369 days.

This patent is subject to a terminal disclaimer.

(21) Appl. No.: 14/923,414

(22) Filed: Oct. 26, 2015

(65) Prior Publication Data

US 2017/0116086 A1 Apr. 27, 2017

(51) Int. Cl.
*G06F 16/23* (2019.01)
*G06F 11/14* (2006.01)

(52) U.S. Cl.
CPC ........ *G06F 11/1451* (2013.01); *G06F 16/235* (2019.01); *G06F 16/2358* (2019.01); *G06F 2201/84* (2013.01)

(58) Field of Classification Search
CPC ......... G06F 17/30365; G06F 17/30368; G06F 17/30174; G06F 17/30575; G06F 17/30191; G06F 11/1471; G06F 17/30306; G06F 17/30463; G06F 2201/84; G06F 9/5083;
(Continued)

(56) References Cited

U.S. PATENT DOCUMENTS 7,433,898 B1 * 10/2008 Georgiev .............. G06F 11/203
7,774,565 B2    8/2010 Lewin et al.
(Continued)

OTHER PUBLICATIONS

Ilyas et al., Adaptive Rank-aware Query Optimization in Relational Databases, ACM Transactions on Database Systems, vol. 31, No. 4, Dec. 2006. All pages.*
(Continued)

*Primary Examiner* — Jay A Morrison
*Assistant Examiner* — Antonio J Caiado
(74) *Attorney, Agent, or Firm* — Martin & Associates, LLC; Bret J. Petersen

(57) ABSTRACT

A journal optimizer in a computer database system with an adaptive journal mechanism. The adaptive journal mechanism dynamically adjusts adaptive parameters of the journal optimizer to optimize the journal based on one or more journal conditions to more efficiently utilize system resources. The adaptive parameters used to adapt the optimization include aggressiveness parameters and the location of the optimizer, where the aggressiveness parameters specify the intensity of optimization of the journal by the journal optimizer. For example, the adaptive journal mechanism may dynamically adjust an adaptive parameter of the optimizer to increase optimization of the journal when the resource utilization indicates the resources are underutilized and decrease optimization of the journal when the resource utilization indicates resources are strained.

7 Claims, 5 Drawing Sheets

(58) Field of Classification Search
CPC ............ G06F 11/1451; G06F 11/1469; G06F 11/1464; G06F 16/235; G06F 16/2358
USPC .................................................. 707/648, 634
See application file for complete search history.

(56) References Cited

U.S. PATENT DOCUMENTS

| | | | |
|---|---|---|---|
| 7,844,856 B1* | 11/2010 | Ahal ................... G06F 11/1471 | 702/120 |
| 7,908,515 B1* | 3/2011 | Schechner .......... G06F 11/1471 | 714/15 |
| 7,979,399 B2* | 7/2011 | Barsness ........... G06F 17/30575 | 707/662 |
| 8,060,713 B1 | 11/2011 | Natanzon | |
| 8,126,929 B2 | 2/2012 | Bhattacharjee et al. | |
| 8,352,425 B2 | 1/2013 | Bourbonnais et al. | |
| 8,688,634 B2 | 4/2014 | Beyer et al. | |
| 8,732,530 B2 | 5/2014 | Ng | |
| 8,745,012 B2 | 6/2014 | Rusher et al. | |
| 8,862,627 B2* | 10/2014 | Ferringer ............... G06N 3/126 | 706/13 |
| 8,914,604 B2* | 12/2014 | Whelan ............. G06F 17/30286 | 711/170 |
| 9,250,974 B1* | 2/2016 | Estes ...................... G06F 9/5072 | |
| 9,798,794 B2* | 10/2017 | Hase .................. G06F 17/30592 | |
| 9,858,301 B1 | 1/2018 | Hardy et al. | |
| 2003/0217031 A1* | 11/2003 | Owen .................. G06F 11/1004 | |
| 2003/0229639 A1* | 12/2003 | Carlson ............. G06F 17/30474 | |
| 2004/0030677 A1* | 2/2004 | Young-Lai ........ G06F 17/30436 | |
| 2009/0307290 A1* | 12/2009 | Barsness ................. G06F 16/27 | |
| 2010/0115000 A1* | 5/2010 | Youngren ......... G06F 17/30008 | 707/818 |
| 2011/0060711 A1* | 3/2011 | Macready .............. B82Y 10/00 | 706/46 |
| 2011/0119437 A1* | 5/2011 | Ogus ................... G06F 12/0888 | 711/104 |
| 2012/0266026 A1* | 10/2012 | Chikkalingaiah ... G06F 11/0712 | 714/38.1 |
| 2013/0013564 A1* | 1/2013 | Ben-Or ............... G06F 11/2038 | 707/640 |
| 2014/0289573 A1 | 9/2014 | Bennah et al. | |
| 2014/0337562 A1* | 11/2014 | Long ..................... G06F 3/0659 | 711/103 |
| 2014/0344510 A1* | 11/2014 | Yoshihara ........... G06F 12/0246 | 711/103 |
| 2014/0379715 A1* | 12/2014 | Kesselman ............. G06F 3/067 | 707/737 |
| 2015/0088822 A1* | 3/2015 | Raja .................. G06F 17/30324 | 707/625 |
| 2015/0088830 A1* | 3/2015 | Kamp ................ G06F 17/30377 | 707/648 |
| 2015/0089134 A1* | 3/2015 | Mukherjee ............. G06F 15/78 | 711/114 |
| 2016/0041906 A1* | 2/2016 | Mukherjee ........... G06F 16/221 | 711/119 |
| 2016/0070726 A1* | 3/2016 | Macnicol .......... G06F 17/30315 | 707/691 |
| 2016/0085834 A1* | 3/2016 | Gleeson ............ G06F 17/30339 | 707/693 |

OTHER PUBLICATIONS

Khan et al. Exploring Query Optimization Techniques in Relational Databases, International Journal of Database Theory and Application vol. 6, No. 3, Jun. 2013. All pages.*

Konik et al., "Aggregating Modifications to a Database for Journal Replay", U.S. Appl. No. 14/738,070, filed Jun. 12, 2015.

Konik et al., "Adaptive Optimization of a Computer Database Journal", U.S. Appl. No. 15/057,277, filed Mar. 1, 2016.

Appendix P—List of IBM Patents or Patent Applications Treated as Related.

* cited by examiner

ADAPTIVE OPTIMIZATION OF A COMPUTER DATABASE JOURNAL

BACKGROUND

1. Technical Field

This disclosure generally relates to data processing and computer databases, and more specifically relates to adaptive optimization of a computer database journal.

2. Background Art

Current databases may include many entries which may be modified many times by various applications. These databases system may employ journaling to provide redundancy in the database and to provide a means by which undesired modifications may be removed. Redundancy is useful in case of corrupted files or system failures. 'Journaling' refers to real-time (or near real time) logging of data-file updates or modifications to database files on a primary database system to be made on a target (or backup) database system. A journal is a data structure that stores each of the modifications tracked during journaling. Generally, such tracking is carried out from a start to an end point. Such start points may be a user specified point in time, an occurrence of a user specified action, a commit or transaction boundary, or at an object save point such as the creation of an object in a database. An end point for tracking database operations may be a user specified point in time, a user specified timestamp, a user specified sequence number, an end of a journal (wherein the journal reaches a maximum number of changes or a maximum size), an end to present changes, a commit or transaction boundary, and so on as will occur to readers of skill in the art. Journal replay refers to the use of the journal to reapply or remove, to the database, the modifications tracked in the journal. For example, a journal may be used to restore a database upon file corruption of one or more tables in the database by reapplying all modification tracked in the journal from the start to the end point. Alternatively, the journal may be used to roll-back a database, modification by modification, to remove one or more undesired changes to the database.

Due to the fact that journals are configured to store every single modification made between the start and endpoints, journals may become quite large in size. Further, to apply or remove each of these modifications during a journal replay may require a very large amount of processing and network resources. Optimizers have been developed to optimize the journal, however, the optimizer also uses significant resources.

BRIEF SUMMARY

The disclosure and claims herein are directed to a journal optimizer in a computer database system with an adaptive journal mechanism. The adaptive journal mechanism dynamically adjusts adaptive parameters of the journal optimizer to optimize the journal based on one or more journal conditions to more efficiently utilize system resources. The adaptive parameters used to adapt the optimization include aggressiveness parameters and the location of the optimizer, where the aggressiveness parameters specify the intensity of optimization of the journal by the journal optimizer. For example, the adaptive journal mechanism may dynamically adjust an adaptive parameter of the optimizer to increase optimization of the journal when the resource utilization indicates the resources are underutilized and decrease optimization of the journal when the resource utilization indicates resources are strained.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The disclosure and claims herein relate to a journal optimizer in a computer database system with an adaptive journal mechanism. The adaptive journal mechanism dynamically adjusts adaptive parameters of the journal optimizer to optimize the journal based on one or more journal conditions to more efficient utilize system resources.

Figure 1:
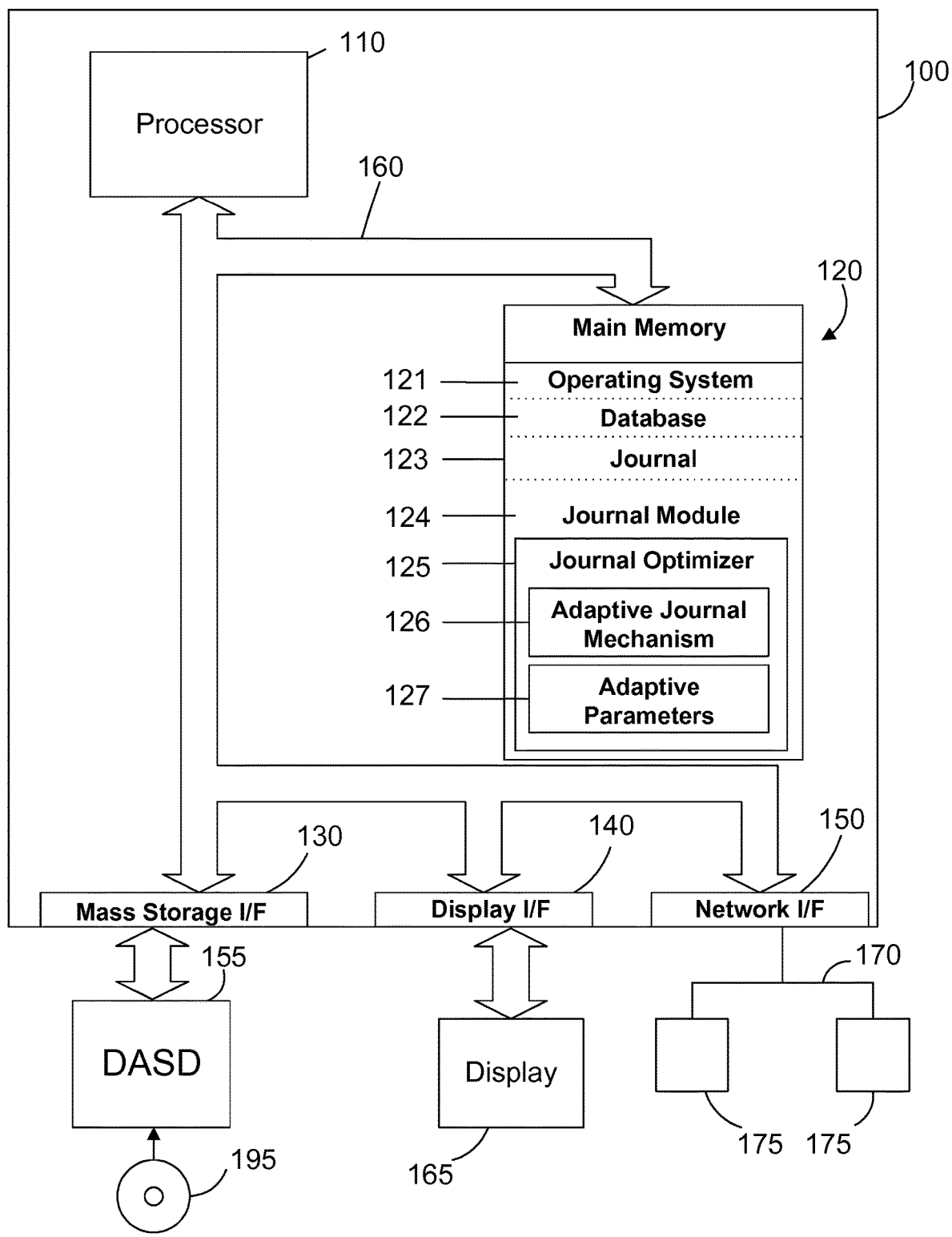
FIG. 1 is a block diagram a computer system with an adaptive journal mechanism for a journal optimizer as described herein.

Referring to FIG. 1, a computer system 100 is one suitable implementation of a computer system that includes an adaptive journal mechanism as described herein. Alternatively, the adaptive journal mechanism may also be executed on a virtual machine. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195. Some devices may have a removable memory card or similar for a direct storage device 155 instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory further includes database 122, a journal 123, a journal module 124 with a journal optimizer 125 that includes an adaptive journal mechanism 126 and adaptive parameters 127 as described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, database 122, journal 123, journal module 124, journal optimizer 125 with the adaptive journal mechanism 126 and the adaptive parameters 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the journal module 124.

Although computer system 100 is shown to contain only a single processor and a single system bus, those skilled in the art will appreciate that a database journal optimizer may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

As introduced above with reference to FIG. 1, the computer system 100 includes a journal module 123. The journal module 123 is a computer program that when executed causes the computer to carry out journaling of modifications made to the database 122. The journal module 124 may operate similar to the prior art except for the additional features of adaptive journal mechanism 126 described further below. The journal module 124 tracks each modification made to the database 122 between a start and end point and stores each of those modifications in the journal 123. The journal module 124 may also be configured with an additional component, referred to here as the journal optimizer 125. While journal optimizers are known in the art, the journal optimizer 125 includes an adaptive journal mechanism 126 and adaptive parameters 127 that are not known in the prior art. The journal optimizer 125 is configured to carry out optimization of the journal. The optimization of the journal as known in the prior art includes journal entry aggregation. The journal optimizer 125 may carry out journal entry aggregation by inserting in a journal optimization table (not shown) a plurality of database entry modifications. Each database entry is associated with a relative record number. For each relative record number, the journal optimizer 125 aggregates in the journal optimization table a plurality of the modifications into a single modification. At a later time, the journal module 124 or other module may replay database changes represented in the journal modification table by applying to the database each of the aggregated modifications and each of the other modifications in the journal optimization table.

Figure 2:
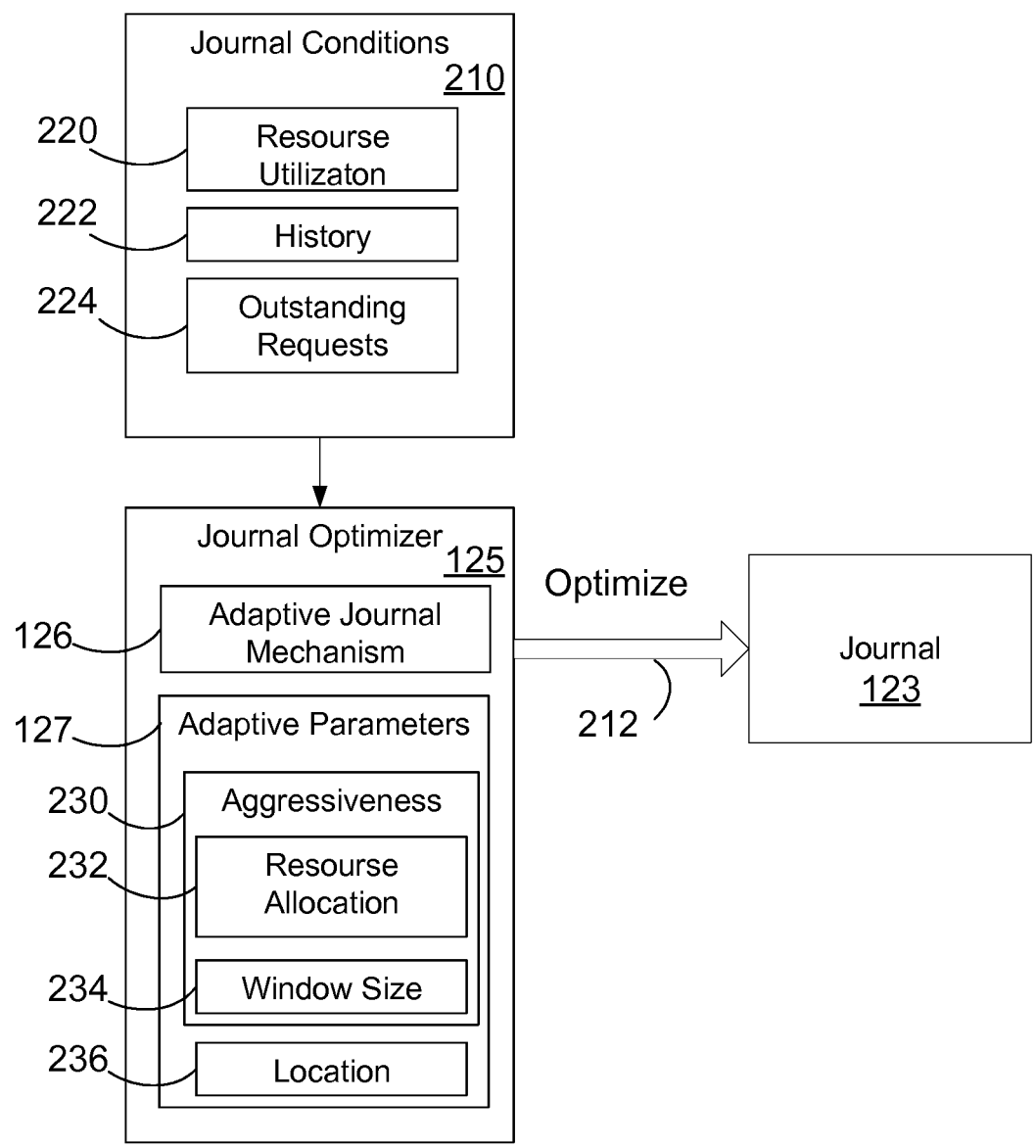
FIG. 2 is a simplified block diagram of an optimizer utilizing an adaptive journal mechanism to optimize a journal.

Referring to FIG. 2, a simplified block diagram illustrates a journal optimizer 125 that utilizes an adaptive journal mechanism 126 to optimize a journal 123. Although the adaptive journal mechanism 126 is shown as a component of the journal optimizer 125, readers of skill in the art will recognize that such a module may also be implemented as a standalone module of computer program instructions, separate from the journal optimizer 125. The adaptive journal mechanism 126 autonomically adapts the optimization of the journal 123 by changing one or more adaptive parameters 127 according to one or more journal conditions 210. The journal conditions 210 that can be used to adapt optimization of the journal include resource utilization 220, history 222 and outstanding requests 224. The adaptive parameters 127 that can be used to adapt the optimization include aggressiveness parameters 230 and location of optimization 236. The aggressiveness parameters 230 specify the intensity of optimization of the journal 123 by the journal optimizer 125. The aggressiveness parameters 230 may include resource allocation 232 and window size 234. The resource allocation 232 may include computer processor resources, input/output resources, memory, etc. The journal conditions 210 and adaptive parameters 127 are described further below.

Again referring to FIG. 2, the adaptive journal mechanism 126 adapts the optimization of the journal 123 according to the journal conditions 210. The adaptive journal mechanism (AJM) 126 may determine the current resource utilization 220 from the operating system 121 (FIG. 1). Resource utilization may include processor utilization, memory utilization, network utilization and input/output utilization. If resource utilization is low, the adaptive resource mechanism 126 may change adaptive parameters 127 to increase journal optimization. Conversely, if the resource utilization 220 is high or resources are strained, the adaptive resource mechanism 126 changes adaptive parameters 127 to reduce journal optimization. Thresholds may be utilized to determine if resource utilization indicates the resources are underutilized or strained. For example, if the CPU utilization of the system is high, the adaptive journal mechanism 126 may change adaptive parameters 127 to be less aggressive, which means the journal optimizer 125 will reduce optimization of the journal 123 to save on CPU utilization. If CPU utilization is low or underutilized, the adaptive journal mechanism 126 may modify the adaptive parameters 127 to increase the aggressiveness, meaning to increase the optimization of the journal 123. If the input/output (I/O) utilization of the database is high, the adaptive journal mechanism 126 may change the adaptive parameters 127 to be more aggressive and increase optimization to reduce the amount of I/O used by the system for journaling. The more aggressive settings of the adaptive parameters 127 may use additional CPU resources but will often decrease the load on I/O resources because it aggregates accesses to the database, thus it is often an advantageous tradeoff.

The adaptive journal mechanism 126 may also adapt the optimization of the journal 123 according to history 222, including historical statistics, in the journal conditions 210 shown in FIG. 2. For example, if the history 222 indicates a high number of aggregations are made by the journal optimizer 125 under certain conditions, then the adaptive journal mechanism 126 may increase its aggressiveness under similar conditions. Conversely, if the history 222 indicates very few aggregations are made by the journal optimizer 125 then the adaptive journal mechanism 126 may scale back its resource use under similar conditions since it is not as likely to be effective. In another example, if a certain entity such as a table, schema, DB, job, or program has a history of having successful or unsuccessful optimizations, then the adaptive journal mechanism 126 could increase or decrease the amount of resources supplied to the journal optimizer 125 for optimizing that entity.

Again referring to FIG. 2, the adaptive journal mechanism 126 may also adapt the optimization of the journal 123 according to outstanding requests 224 in the journal conditions 210. Outstanding requests 224 refer to the number of requests made to the database. The outstanding requests are stored as journal entries in the journal 123 as described further below with reference to FIG. 3. For example, if there are very few outstanding requests, the adaptive journal mechanism 126 may set the adaptive parameters 127 to be less aggressive or even go to sleep and wait for more requests. Alternatively, if there are a high number of outstanding requests, the adaptive journal mechanism 126 may set the adaptive parameters 127 to be more aggressive to ensure the backup database on the target database system does not fall too far behind the primary or source database system.

Figure 3:
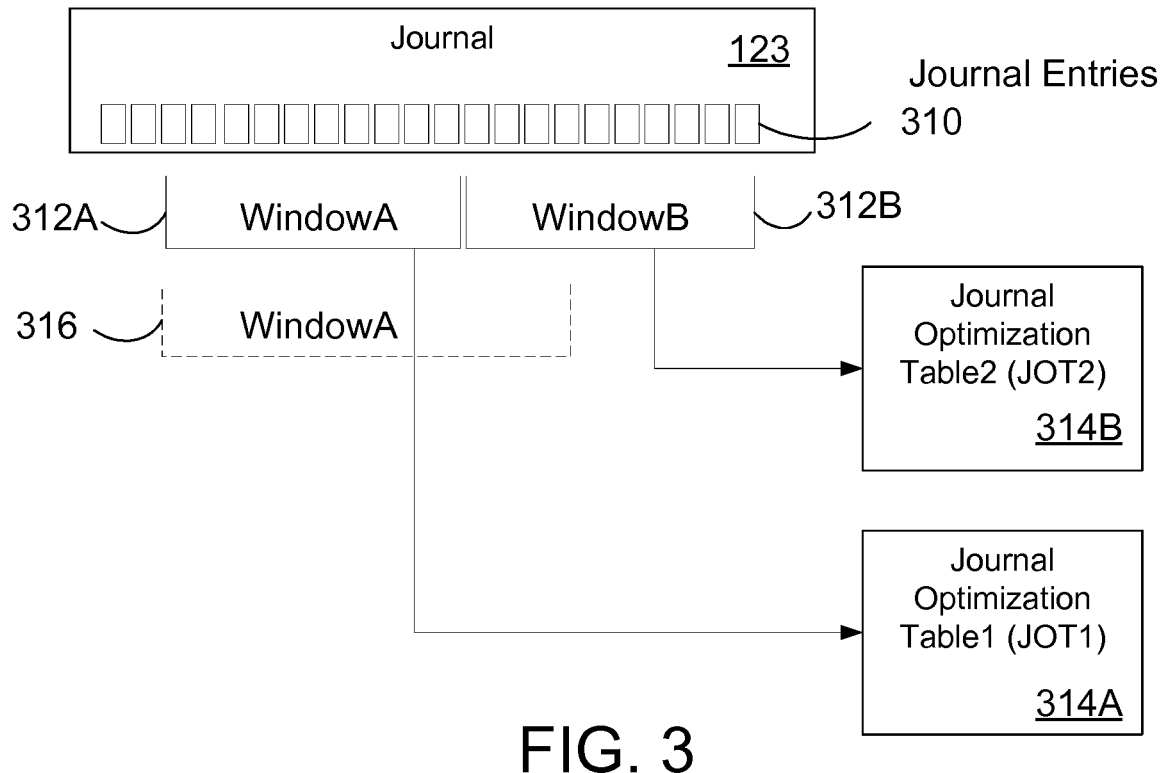
FIG. 3 is a simplified block diagram illustrating window size adjustment by the adaptive journal mechanism.
Figure 4:
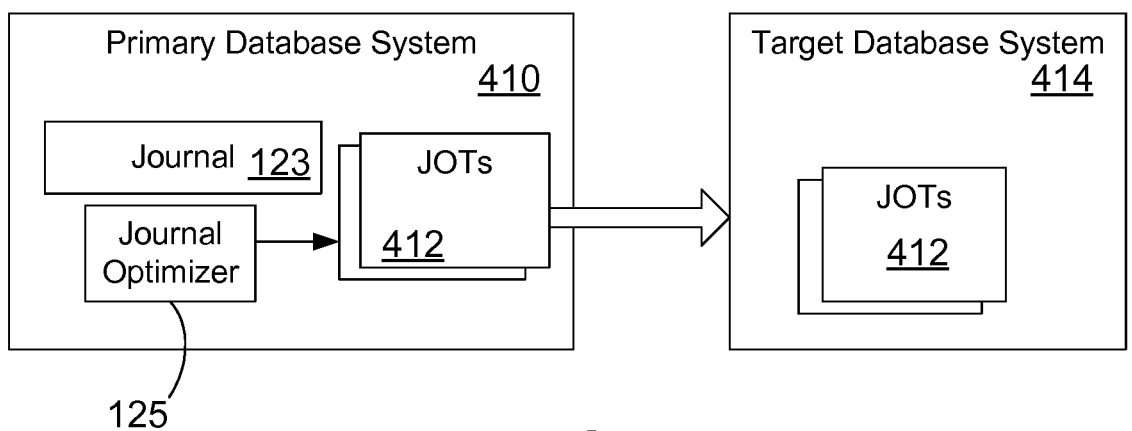
FIG. 4 is a simplified block diagram illustrating the typical location for the optimization components when optimizing a journal.

Referring now to FIG. 3, a simplified block diagram illustrates window size adjustment by the adaptive journal mechanism 126 (FIG. 2). A journal 123 typically contains a number of journal entries 310. The journal entries 310 indicate requests for changes to be made to the local database that need to also be made to a database on a target database system 414, as shown in FIG. 4. The journal optimizer 125 (FIG. 2) processes a certain number of the journal entries and places the aggregated journal entries into a journal optimization table. In this example, the journal entries 310 within windowA 312A are processed and the resulting aggregated entries are placed in JOT1 314A. Similarly, the journal entries 310 within windowB 312B are processed and the resulting aggregated entries are placed in JOT2 314B. The journal optimizer 125 continues to process the journal entries and place the aggregated journal entries into journal optimization tables (not shown). The widow size may be defined as a specific period of time. For example, the windows size (defined by start and end times) may be defined to process the queued database operations in the journal every 3 seconds, every 10 seconds, or every minute. Alternatively, the window size may also be defined by a specific number of journal entries.

As discussed above with reference to FIG. 2, the adaptive journal mechanism 126 autonomically adapts the optimization of the journal 123 by changing adaptive parameters 127 according to one or more journal conditions 210. One of the adaptive parameters is the window size as described in FIG. 3. The adaptive journal mechanism 126 adjusts the size of the window according to the journal conditions 210. In the example shown in FIG. 3, the adaptive journal mechanism 126 adjusts the size of windowA 312A to a larger adjusted windowA 316 shown in dotted lines. The size of the window may be adjusted larger for a variety of reasons. For example, when CPU resources utilization is low, more efficient optimization can be done by increasing the window size. Also, JOTs can be merged which is another way of effectively increasing the window size. A new window may be merged with a previous optimized JOT when resources are available or history or statistics indicate merging would be effective. Similarly, a first JOT may be combined with a second JOT producing a third super JOT (SJOT) which includes an optimization covering the previous two optimized sets. This operation may be attempted when I/O is backed up, but ample CPU exists to examine and reexamine multiple JOTs or SJOTs. For example, there may be a background thread working across multiple JOTs. Window size may also be tailored around active tables as sometimes updates will come in bursts of several operations for one table.

FIG. 4 illustrates the typical location for the optimization components when optimizing a journal. The journal optimizer 125 resides in the primary database system 410. The journal optimizer 125 optimizes the journal 123 to create journal optimization tables 412 as discussed above. The journal optimization tables 412 are then sent to the target database system 414. The journal optimization tables 412 are used by the target database system to replicate the database of the primary database system 410 on the target database system 414. Database replication similar to that shown in FIG. 4 is known in the art, but does not include a journal optimizer 125 with an adaptive journal mechanism 126 and adaptive parameters 127 shown in FIG. 1.

Figure 5:
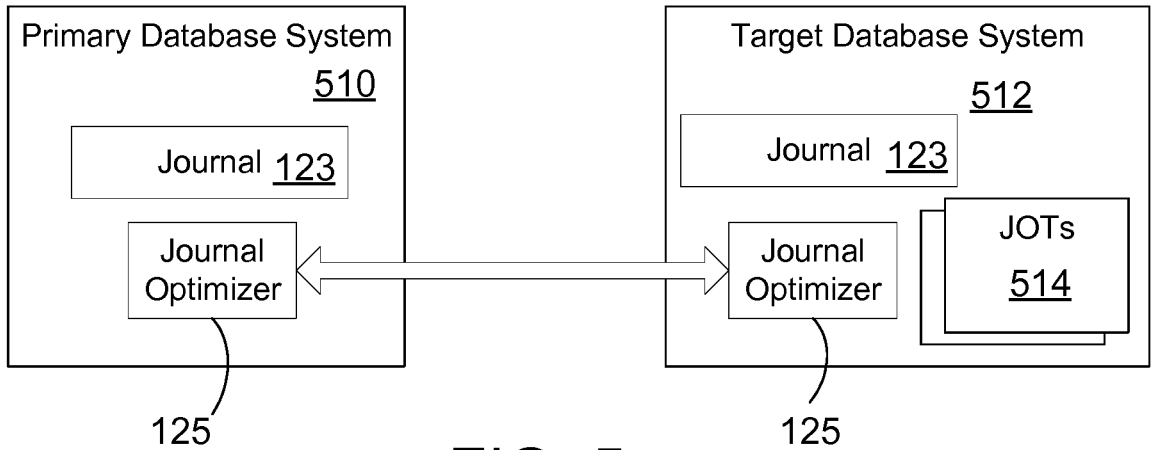
FIG. 5 is a simplified block diagram illustrating moving the location of journal optimizer by the adaptive journal mechanism.

FIG. 5 illustrates relocation of optimization by the adaptive journal mechanism. As introduced above, the journal optimizer 125 is shown in the primary database system 510 to optimize the journal 123. One of the adaptive parameters 127 introduced above is the location 236 (FIG. 2) of the optimization. The adaptive journal mechanism 126 may relocate the journal optimizer 125 to a more optimal location. In the example shown in FIG. 5, the adaptive journal mechanism 126 relocates the journal optimizer 125 to the target database system 512. The journal optimizer 125 now in the target database system 512 can optimize the journal 123 and create journal optimization tables 514 in the target database system 512. The journal optimization tables 514 are used by the target database system 512 to duplicate the database of the primary database system 510 on the target database system 512. Similarly, the adaptive journal mechanism may relocate the journal optimizer 125 back to the primary database system 510. For example, if one of the primary or target database systems has high CPU usage, the adaptive journal mechanism 126 may migrate the journal optimizer 125 to the other machine to perform the optimization. Conversely, if both the primary and target machines have high CPU usage, a third machine (not shown) may be utilized to do the journal optimization. For example, this could be done in a Cloud environment where new virtual machines can be brought up or down easily. In other examples, the location of optimization could be determined by resource availability. For example, a target machine frequently is a smaller machine, so it may be important to do the optimization processing on a larger production machine. In another example, if the network has high utilization, the adaptive journal mechanism 126 may relocate optimization to the source machine to optimize/aggregate the journal data so that a large journal does not need to be sent over the network.

Figure 6:
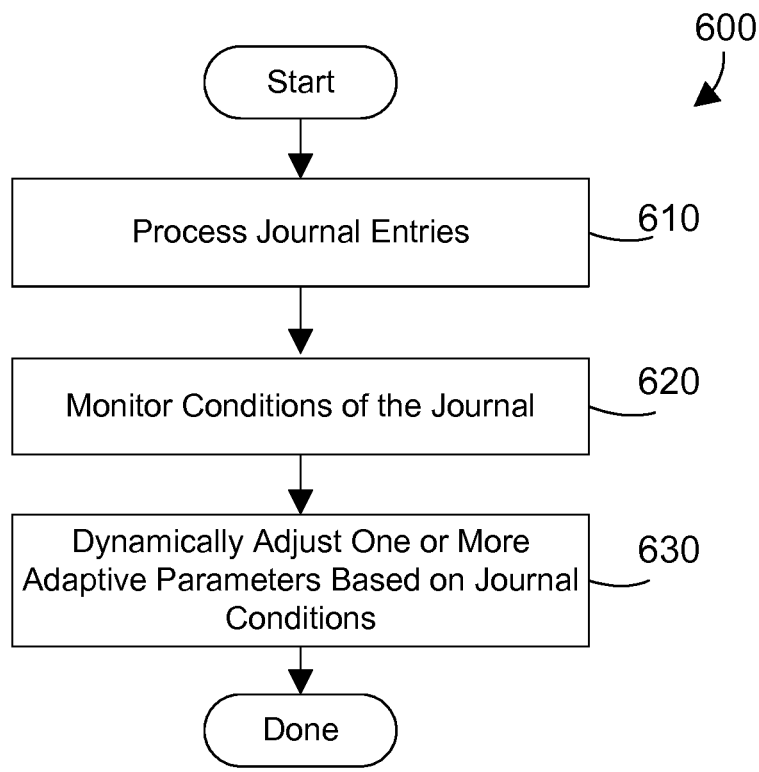
FIG. 6 is a flow diagram of a method for an adaptive journal mechanism.

Referring to FIG. 6, a method 600 shows one suitable example of a method performed by an adaptive journal mechanism. Portions of method 600 are preferably performed by the journal optimizer 125 and the adaptive journal mechanism 126. First, process the journal entries of the journal (step 610). Monitor the journal conditions (step 620). Then, dynamically adjust one or more adaptive parameters based on the journal conditions (step 630). The method is then done.

Figure 7:
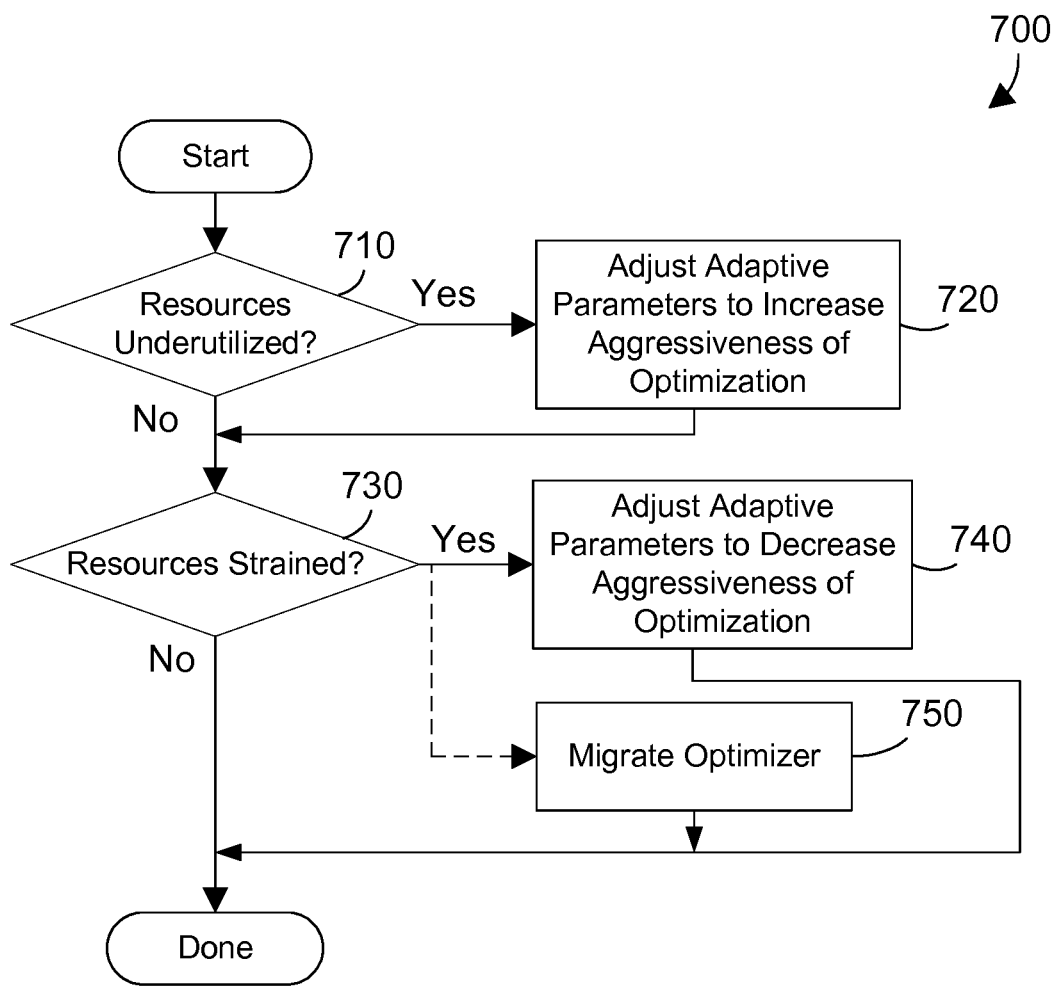
FIG. 7 is a flow diagram of a specific method for step 630 in FIG. 6.

FIG. 7 shows one suitable example of a method 700 for an adaptive journal mechanism to dynamically adjust adaptive parameters based on journal conditions. Method 700 thus shows a suitable method for performing step 630 in method 600. First, when the journal conditions indicate the resources are underutilized (step 710=yes) then adjust the adaptive parameters to increase the aggressiveness of the optimization (step 720). When the journal conditions do not indicate the resources are underutilized (step 710=no), then determine if the resources of the journal are strained (step 730). When the resources of the journal are strained (step 730=yes), then adjust the adaptive parameters to decrease the aggressiveness of the optimization (step 740). Alternatively, when the resources of the journal are strained (step 730=yes) then migrate the optimizer (step 750). When the resources of the journal are not strained (step 730=no), then the method 700 is done.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The disclosure and claims herein relate to a journal optimizer in a computer database system with an adaptive journal mechanism. The adaptive journal mechanism dynamically adjusts adaptive parameters of the journal optimizer to optimize the journal based on one or more journal conditions to more efficiently utilize system resources.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method for adaptive optimization of a journal by a journal optimizer for a computer database, the method comprising:
   processing journal entries in the journal;
   monitoring at least one journal condition;
   dynamically adjusting at least one adaptive parameter of the journal optimizer depending on the at least one journal condition wherein the at least one adaptive parameter of the journal optimizer specifies an intensity of optimization of the journal optimizer;
   wherein the at least one adaptive parameter comprises a window size of the journal, and wherein the window size of the journal corresponds to a number of journal entries selected from the journal and aggregated together into aggregated journal entries for a journal optimization table;
   placing the aggregated journal entries into the journal optimization table;
   increasing the window size to increase the number of journal entries selected to increase optimization of the journal when the resource utilization indicates resources are underutilized; and
   decreasing the window size to decrease the number of journal entries selected to decrease optimization of the journal when the resource utilization indicates resources are strained.

2. The method of claim 1 wherein the at least one journal condition is chosen from the following: resource utilization, history of the journal, and outstanding requests in the journal.

3. The method of claim 2 wherein the resource utilization comprises processor utilization and memory utilization.

4. The method of claim 1 wherein the at least one adaptive parameter comprises resource allocation and the resource allocation comprises memory allocation, processor allocation and input/output resource allocation.

5. The method of claim 1 wherein the at least one adaptive parameter comprises the location of the optimizer.

6. A computer-implemented method for adaptive optimization of a journal by an optimizer for a computer database, the method comprising:
   processing journal entries in the journal;
   monitoring at least one journal condition, wherein the at least one journal condition is chosen from the following: outstanding requests in the journal, history of the journal, and outstanding requests;
   dynamically adjusting a window size of the journal depending on the at least one journal condition wherein the window size corresponds to a number of journal entries selected from the journal and aggregated together into aggregated journal entries for a journal optimization table;
   wherein dynamically adjusting the window size comprises increasing the window size to increase the number of journal entries selected to increase optimization of the journal when the resource utilization indicates resources are underutilized, and decreasing the window size to decrease the number of journal entries selected to decrease optimization of the journal when the resource utilization indicates resources are strained; and
   placing the aggregated journal entries into the journal optimization table.

7. A computer-implemented method for adaptive optimization of a journal by an optimizer for a computer database, the method comprising:
   processing journal entries in the journal;
   monitoring at least one journal condition, wherein the at least one journal condition comprises: resource utilization, outstanding requests in the journal, history of the journal, and outstanding requests wherein the resource utilization comprises processor utilization and memory utilization;
   dynamically adjusting a window size of the journal depending on the at least one journal condition wherein the window size corresponds to a number of journal entries selected from the journal and aggregated together into aggregated journal entries for a journal optimization table;
   wherein dynamically adjusting the window size comprises increasing the window size to increase the number of journal entries selected to increase optimization of the journal when the resource utilization indicates resources are underutilized, and decreasing the window size to decrease the number of journal entries selected to decrease optimization of the journal when the resource utilization indicates resources are strained;
   placing the aggregated journal entry into a journal optimization table; and
   replicating the computer database on a target database using the journal optimization table.

* * * * *